United States Patent
Van Phan et al.

(10) Patent No.: US 12,160,734 B2
(45) Date of Patent: Dec. 3, 2024

(54) METHODS, APPARATUSES, COMPUTER READABLE MEDIA AND COMPUTER PROGRAMS FOR PERFORMING ADMISSION CONTROL FOR LIMITED ACCESS SERVICE

(71) Applicant: NOKIA TECHNOLOGIES OY, Espoo (FI)

(72) Inventors: Vinh Van Phan, Oulu (FI); Ling Yu, Kauniainen (FI); Hannu Petri Hietalahti, Kiviniemi (FI)

(73) Assignee: Nokia Technologies Oy, Espoo (FI)

( * ) Notice: Subject to any disclaimer, the term of this patent is extended or adjusted under 35 U.S.C. 154(b) by 754 days.

(21) Appl. No.: 17/264,185

(22) PCT Filed: Jul. 31, 2018

(86) PCT No.: PCT/EP2018/070766
§ 371 (c)(1),
(2) Date: Jan. 28, 2021

(87) PCT Pub. No.: WO2020/025112
PCT Pub. Date: Feb. 6, 2020

(65) Prior Publication Data
US 2021/0314774 A1    Oct. 7, 2021

(51) Int. Cl.
*H04W 12/06* (2021.01)
*H04L 67/141* (2022.01)
(Continued)

(52) U.S. Cl.
CPC .......... *H04W 12/06* (2013.01); *H04L 67/141* (2013.01); *H04W 4/06* (2013.01); *H04W 4/40* (2018.02);
(Continued)

(58) Field of Classification Search
CPC ......... H04W 12/06; H04W 4/06; H04W 4/40; H04W 12/08; H04W 48/16; H04W 76/10;
(Continued)

(56) References Cited

U.S. PATENT DOCUMENTS 8,584,224 B1     11/2013   Pei et al.
2014/0091900 A1   4/2014   Kohlenberg et al.
(Continued)

FOREIGN PATENT DOCUMENTS

EP     1 770 953 A2    4/2007

OTHER PUBLICATIONS

Shanzhi Chen et al., "Vehicle-to-everything (V2X) Services supported by LTE-based system and 5G," Jun. 2017, pp. 70-76. (Year: 2017).*

(Continued)

*Primary Examiner* — Luu T Pham
*Assistant Examiner* — Canh Le
(74) *Attorney, Agent, or Firm* — Barta Jones, PLLC

(57) ABSTRACT

To provide a limited access service to one or more applications, for example V2E applications, one or more preconfigured credentials in a user device a vehicle is equipped with are used by a base station to authenticate, from an application server, for example a V2E application server, the user device. If the authentication succeeds, a limited access service is granted.

7 Claims, 3 Drawing Sheets

(51) Int. Cl.
*H04W 4/06* (2009.01)
*H04W 4/40* (2018.01)
*H04W 12/08* (2021.01)
*H04W 48/16* (2009.01)
*H04W 76/10* (2018.01)

(52) U.S. Cl.
CPC ........... *H04W 12/08* (2013.01); *H04W 48/16* (2013.01); *H04W 76/10* (2018.02)

(58) Field of Classification Search
CPC ... H04W 12/069; H04W 12/37; H04W 12/50; H04W 76/18; H04L 67/141
See application file for complete search history.

(56) References Cited

U.S. PATENT DOCUMENTS

| | | | | |
|---|---|---|---|---|
| 2015/0312942 | A1* | 10/2015 | Cui | H04W 28/14 370/329 |
| 2016/0050281 | A1* | 2/2016 | Jain | H04L 67/141 726/7 |
| 2016/0226848 | A1* | 8/2016 | Yuan | H04L 63/102 |
| 2017/0288886 | A1* | 10/2017 | Atarius | H04L 47/20 |
| 2018/0152819 | A1* | 5/2018 | Pinheiro | H04L 69/22 |
| 2018/0206089 | A1* | 7/2018 | Cavalcanti | H04W 48/16 |
| 2018/0242385 | A1* | 8/2018 | Chandramouli | H04W 4/44 |
| 2019/0124489 | A1* | 4/2019 | Ahmad | H04W 4/70 |
| 2020/0162908 | A1* | 5/2020 | Kim | H04W 40/24 |
| 2021/0185504 | A1* | 6/2021 | Wong | H04W 8/005 |

OTHER PUBLICATIONS

Zubair Amjad, "Low Latency V2X applications and Network requirements: Performance evaluation," Jun. 26-30, 2018, pp. 220-225. (Year: 2018).*

International Search Report and Written Opinion dated May 21, 2019 corresponding to International Patent Application No. PCT/EP2018/070766.

3GPP TS 23.285 V15.1.0 (Jun. 2018), Technical Specification, 3rd Generation Partnership Project; Technical Specification Group Services and System Aspects; Architecture enhancements for V2X services (Release 15), Jun. 19, 2018, pp. 1-36, XP051472855.

3GPP TR 23.786 V0.7.0 (Jul. 2018), Technical Report, 3rd Generation Partnership Project; Technical Specification Group Services and System Aspects; Study on architecture enhancements for EPS and 5G System to support advanced V2X services (Release 16), Jul. 10, 2018, pp. 1-57, XP051474960.

C. Rigney et al., "Remote Authentication Dial in User Service (RADIUS)," Network Working Group, RFC 2865, Jun. 1, 2000, XP015008648.

* cited by examiner

METHODS, APPARATUSES, COMPUTER READABLE MEDIA AND COMPUTER PROGRAMS FOR PERFORMING ADMISSION CONTROL FOR LIMITED ACCESS SERVICE

TECHNICAL FIELD

Various example embodiments relates to wireless communications.

BACKGROUND

Wireless communication systems are under constant development. An example is vehicle-to-everything (V2X) communication, originally based on wireless local area network technology but now extending to use cellular networks to provide a wider variety of services. Since cellular networks are operator-specific networks, it has been agreed to enable vehicle-to-vehicle communications regardless of whether vehicle devices are subscribers of the same or different operators, and regardless whether there is a roaming agreement between the operators. Hence, there is a need for a mechanism that provides the required access to a radio access network of another operator even when there is no roaming agreement.

BRIEF DESCRIPTION

According to an aspect, there is provided the subject matter of the independent claims. Some embodiments are defined in the dependent claims.

An aspect provides a network node providing wireless access, the network node comprising: at least one processor; and at least one memory including computer program code; the at least one memory and computer program code configured to, with the at least one processor, cause the access point at least to perform: providing a limited access service to one or more applications; sending, in response to receiving from a user device a request for the limited access service with one or more credentials for an application, an authentication request with the one or more credentials to an application server for the application; and granting, in response to receiving a response indicating a successful authentication of the credentials from the application server, the user device the limited access service for the application.

In another aspect, the at least one memory and computer program code configured to, with the at least one processor, further cause the network node at least to perform broadcasting information that is supports the limited access service.

In an aspect, the at least one memory and computer program code configured to, with the at least one processor, further cause the network node at least to perform establishing a connection to the application server for authentication.

In a still another aspect, wherein the at least one memory and computer program code configured to, with the at least one processor, further cause the network node at least to perform: configuring one or more radio bearers for the limited access service for the application; and causing sending to the user device a radio resource control connection establishment response that indicates the one or more radio bearers as a response granting the limited access service for the application.

According to an aspect of the network node, the application is a vehicle to everything service application and the application server is a vehicle-to-everything application server.

An aspect provides a user device comprising: at least one processor; and at least one memory including computer program code and, at least for one application, one or more preconfigured credentials; the at least one memory and computer program code configured to, with the at least one processor, cause the user device at least to perform: detecting a cell providing limited access service to one or more applications including the one application; causing sending a request for the limited access service for the one application with the one or more preconfigured credentials; and performing, in response to receiving access to the limited access service, limited access service communication for the one application.

In another aspect, the at least one memory and computer program code configured to, with the at least one processor, further cause the user device at least to perform causing sending the request with the one or more credentials in a radio resource control connection request.

In a further aspect, the at least one memory and computer program code configured to, with the at least one processor, further cause the user device at least to perform causing sending the request with the one or more credentials in response to the cell locating in a network without a roaming agreement with the network to which the user device has a subscription.

In a still another aspect of the user device the one application is a vehicle-to-everything service application.

An aspect provides an application server comprising: at least one processor; and at least one memory including computer program code; the at least one memory and computer program code configured to, with the at least one processor, cause the application server at least to perform: receiving from a network node providing wireless access to user devices an authentication request comprising one or more credentials; searching amongst credentials issued by the application server or a system whereto the application server belongs a match for the received one or more credentials; and sending an authentication response indicating a successful authentication in response to a match being found.

In another aspect, the application server is a vehicle-to-everything application server and the system is an intelligent transportation system.

An aspect provides a method comprising: providing, by a network node providing wireless access, a limited access service to one or more applications; receiving in the network node from a user device a request for the limited access service with one or more credentials for an application; sending, in response to the request, from the network node, an authentication request with the one or more credentials to an application server for the application; receiving, in the network node, a response indicating a result of authentication of the one or more credentials from the application server; and granting, by the network node, in response to the response indicating a successful authentication, the user device the limited access service for the application.

In an aspect, the method further comprises broadcasting, by the network node, information that it supports the limited access service.

In another aspect, the method further comprises establishing a connection from the network node to the application server for authentication.

In a further aspect, the method further comprises: configuring, by the network node, one or more radio bearers for the limited access service for the application; and causing, by the network node, sending to the user device a radio resource control connection establishment response that indicates the one or more radio bearers as a response granting the limited access service.

An aspect provides a method comprising: detecting, by a user device, a cell providing limited access service to one or more applications; causing, by the user device, sending a request for the limited access service for an application with one or more preconfigured service credentials in a memory for the application; and performing, in response to receiving access to the limited access service, limited access service communication.

In an aspect, the method further comprises causing sending the request with the one or more credentials in a radio resource control connection request.

An aspect provides a method comprising: receiving, by an application server, from a network node providing wireless access to user devices an authentication request comprising one or more credentials; searching, by the application server, amongst credentials issued by the application server, or a system whereto the application server belongs, a match for the received one or more credentials; and sending, by the application server, an authentication response indicating a successful authentication in response to a match being found.

In an aspect, the application is a vehicle-to-everything application.

An aspect provides a non-transitory computer readable medium comprising program instructions for causing an apparatus configured to act as a network node providing wireless access to perform at least the following: providing a limited access service to one or more applications; sending, in response to receiving from a user device a request for the limited access service with one or more credentials for an application, an authentication request with the one or more credentials to an application server for the application; and granting, in response to receiving a response indicating a successful authentication of the credentials from the vehicle-to-everything application server, the user device the limited access service for the application.

Another aspect provides a non-transitory computer readable medium comprising program instructions for causing an apparatus configured to act as a user device in a wireless network to perform at least the following: detecting a cell providing limited access service to one or more applications; causing sending a request for the limited access service for an application with the one or more preconfigured credentials for the application in a memory; and performing, in response to receiving access to the limited access service for the application, limited access service communication for the application.

An aspect provides a computer program comprising instructions for causing an apparatus configured to act as a network node providing wireless access to perform at least the following: providing a limited access service to one or more applications; sending, in response to receiving from a user device a request for the limited access service with one or more credentials for an application, an authentication request with the one or more credentials to an application server for the application; and granting, in response to receiving a response indicating a successful authentication of the credentials from the application server, the user device the limited access service for the application.

An aspect provides a computer program comprising instructions for causing an apparatus configured to act as a user device in a wireless network to perform at least the following: detecting a cell providing limited access service to one or more applications; causing sending a request for the limited access service for an application with the one or more preconfigured credentials for an application in a memory; and performing, in response to receiving access to the limited access service for the application, limited access service communication.

One or more examples of implementations are set forth in more detail in the accompanying drawings and the description below. Other features will be apparent from the description and drawings, and from the claims.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

Embodiments and examples described herein may be implemented in any communications system comprising wireless connection(s). In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
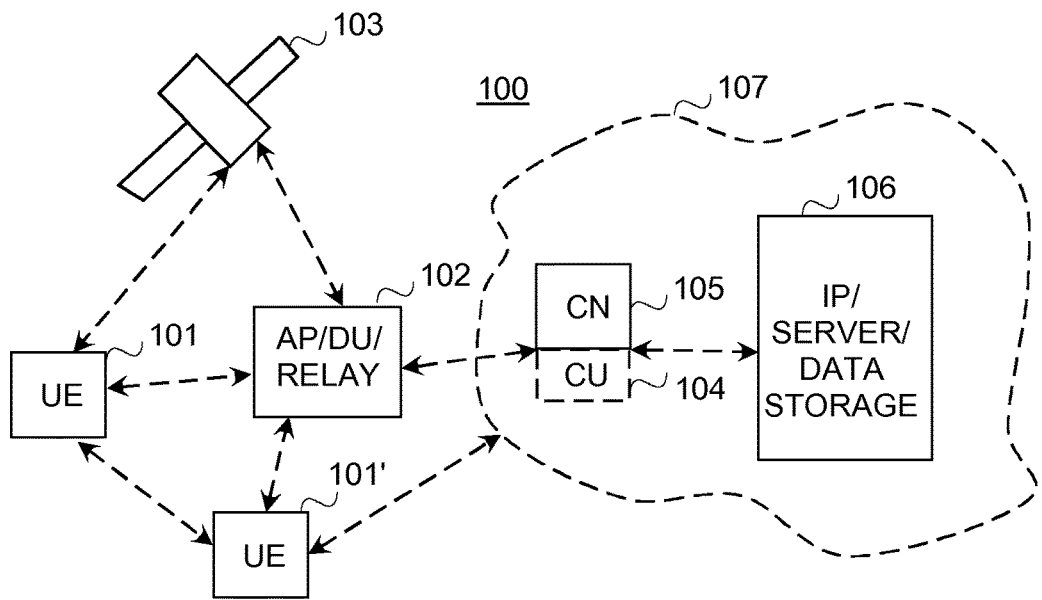
FIGS. 1 and 2 illustrate exemplified wireless communication systems.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyberphysical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHZ-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As mentioned, existence of wireless networks on unlicensed frequency bands is constantly increasing. Base stations, called below access points, may support one or more radio access technologies configured to operate on the unlicensed bands, and user devices may be configured to support multiple radio access technologies, on the unlicensed, licensed, and/or on shared frequency bands. Examples of radio access technologies using the unlicensed band include IEEE 802.11 (WiFi), IEEE 802.15, IEEE 802.16, Long-Term Evolution Unlicensed (LTE-U), Licensed Assisted Access (LAA), LTE-Wi-Fi Aggregation (LWA), New Radio Licensed Assisted Access (NR-LAA), other unlicensed variants standardized as a part of 5G technology, MulteFire. Many of the user devices can send and receive data on multiple radio access technologies, such as cellular, Long Term Evolution (LTE), IEEE 802.11 (Wi-Fi), IEEE 802.15.1 (Bluetooth®), and other radio access technologies. Some radio access technologies operate also on licensed frequency bands. Further, some radio access technologies may operate on several unlicensed frequency band. For example, IEEE 802.11 operates on 2.4 GHz, 5 GHZ, and 60 GHz unlicensed frequency bands. An example of a shared frequency band (shared wireless access) is Citizens Broadband Radio Service (CBRS) that operates on 3.5 GHz band, using the same radio interface as LTE in the licensed spectrum or in the unlicensed 5 GHZ band.

Below different examples are explained using vehicle-to-everything, V2X, service applications as examples of an application that can use a limited access service, without limiting the examples to such a solution. It is a straightforward solution to implement the examples to other corresponding applications that can use the limited access service and in which a user device is preconfigured with one or more credentials by the server side, the credential(s) being required to access the service/application.

The limited access service differs from full network access services in that respect that in the limited access service a user device does not need to access a core network for authentication and for communication. The limited access service may be used for controlling and/or operating some local services such as V2X services. For example, the limited access service may include resource allocation, scheduled by a base station, for direct vehicle-to-vehicle/device-to-device communication. Another example includes a local routed communication via one or more base stations, meaning that the communication between two user devices are routed via the one or more base stations, without the communication passing through a core network. Still a further example includes, for local access services or for a local breakout, a communication from a base station to an V2X application server directly.

Figure 2:
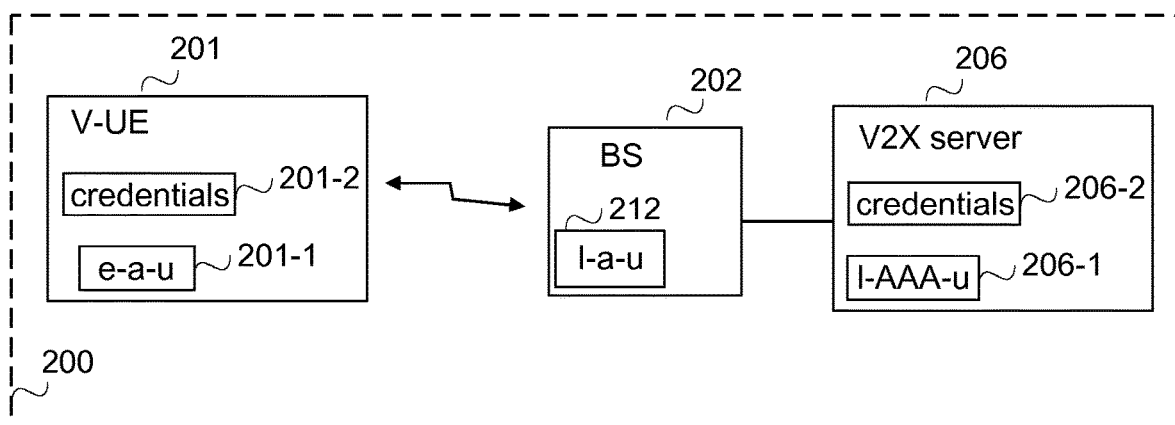

FIG. 2 illustrates a simplified example of a wireless system 200 providing vehicle to anything services via a cellular radio access network. FIG. 2 is a simplified system architecture only showing some elements and functional entities, all being logical units whose implementation may differ from what is shown. It is apparent to a person skilled in the art that the system may comprise any number of the illustrated elements and functional entities, and also entities and elements not illustrated.

Referring to FIG. 2, the wireless system 200 comprises a vehicle equipped with user equipment 201 (V-UE), a base station BS 202 providing a radio access network and a vehicle to anything V2X application server 206. The base station 203 and the V2X application server 206 are part of a roadside unit (RSU), which is a stationary infrastructure entity supporting V2X applications that can exchange messages with other entities supporting V2X applications. In other words, the RSU is a logical entity that combines V2X application logic with the functionality of a base station.

The user equipment the vehicle is equipped with 201 (V-UE) refers to a wireless computing device (equipment, apparatus), and it may also be referred to as a user terminal, terminal device, or a mobile terminal or a machine-type-communication (MTC) device, also called Machine-to-Machine device and peer-to-peer device. Such computing devices (apparatuses) include wireless mobile communication devices operating with or without a subscriber identification module (SIM) in hardware or in software. Below term "user device of vehicle" is used to cover all such equipment. To support the limited access service for one or more applications, for example a service relating to V2X applications, the user device of the vehicle comprises an enhanced access unit (e-a-u) 201-1. Further, in the memory 201-2 there are one or more preconfigured V2X application specific credentials of the user device of the vehicle.

The base station (BS) 202 is a network node providing via a cell in the radio access network wireless access to user terminals served in the cell. The network node may be eNodeB, 5gNB, etc. Herein the term base station covers all of them. The base station may be configured to support limited access services relating to one or more applications, that in the illustrated example are V2X applications. For that purpose, the base 202 comprises a limited access unit (l-a-u) 202-1.

A vehicle-to-everything V2X application server 206 is an example of an application server. The V2X application server 206 is a computing device/apparatus that provides the server side functionalities corresponding to the V2X applications in an intelligent transportation system (ITS). For example, the V2X application server may act as a platooning server. V2X application servers in different domains can communicate with each other for the exchange of V2X messages. To support limited access services to V2X applications the V2X server comprises a limited access authentication, authorization and accounting unit (l-AAA-u) 206-1, or shortly a limited access authentication unit. Further, in the memory 206-2 there are preconfigured V2X application specific credentials of user terminals required to use the application.

Figure 3:
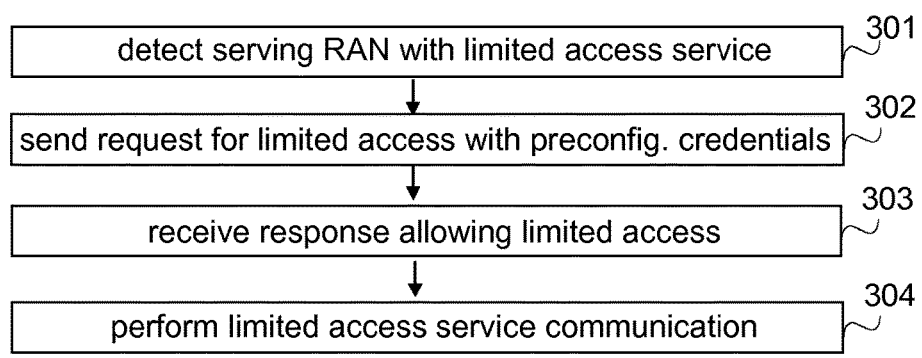
FIGS. 3 to 5 illustrate exemplified processes.

FIG. 3 is a flow chart illustrating an exemplified basic functionality of a user device of the vehicle, or more precisely basic functionality of the enhanced access unit to gain the limited access service. In the example it is assumed that the authentication succeeds and the limited access service will be provided.

Referring to FIG. 3, a cell, in which the limited access service is provided, is detected in block 301. The cell may be in a home network with no access restrictions, or a cell in the home network with access restrictions, or in a visited network with a roaming agreement or in a visited network without a roaming agreement. In other words, the cell may be a cell via which a connection to the core network is available or is not available. The detection may be based on information on the cell explicitly indicating that the limited access service is provided. The indication may also be an implicit one. For example, the user device may be configured to detect the limited access service when it cannot receive a connection involving the core network. Alternatively, or in addition to, the user device may be configured to detect the limited access service implicitly, for example when the user device detects that the cell support one or more certain services, such as the V2X service. Regardless of the indication being explicit or implicit and whether the cell is in the home network or in a visited network, etc., the cell is selected and therefore a request for limited access service for an application with one or more preconfigured credentials is sent in block 302 to a base station providing the cell. The one or more credentials in the request are preconfigured to the memory of the user device and are application-specific credentials for the specific user device/user. When a response that allows for the application a limited access service is received in block 303 over a connection indicated in the response, limited access service communication is performed in block 304 for the application.

Figure 4:
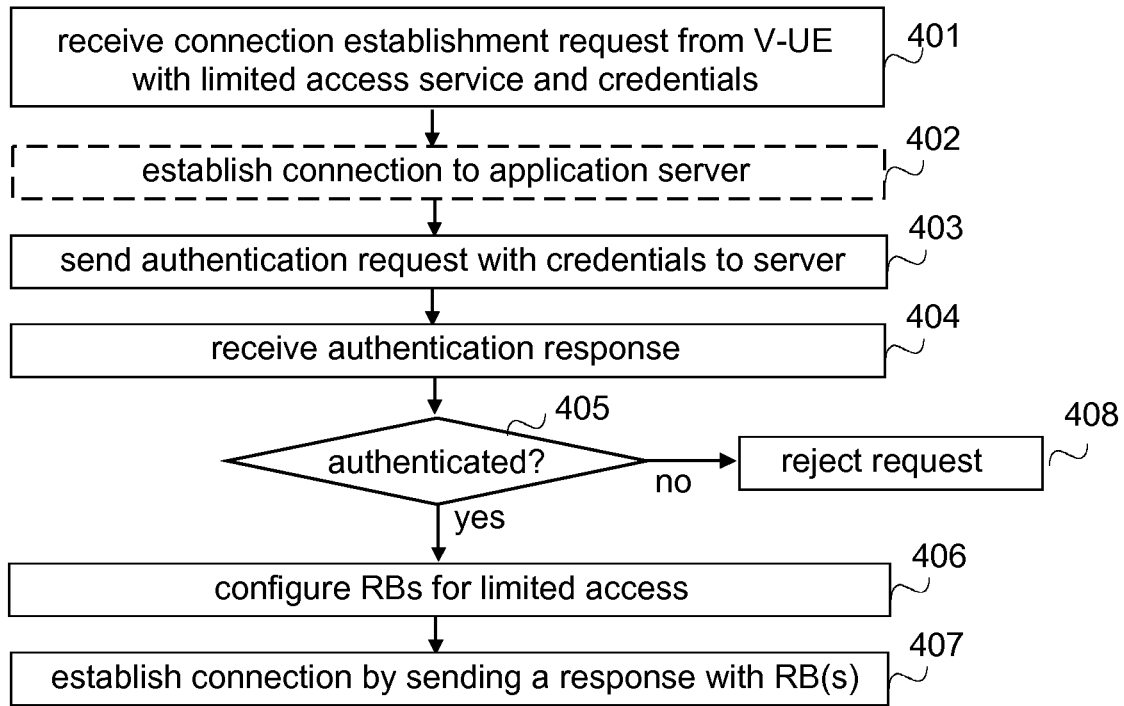

FIG. 4 is a flow chart illustrating an exemplified basic functionality of a base station, or more precisely basic functionality of the limited access unit.

Referring to FIG. 4, a connection establishment request from a user device of the vehicle is received in block 401 with indication that the request is for a limited access service for an application and with one or more credentials. Then, if there is not yet a connection to the application server from the base station, the connection is established in block 402. The connection between the base station and the application server may be a direct connection meaning that there is no need to establish the connection via a core network. The connection may alternatively be an indirect connection. It bears no significance how the physical connection is established, as long as there is a logical connection between the base station and the application server, for following information exchange relating to credentials. The logical connection may be a default connection between the base station and the application server. In other words, there is no need for a dedicated connection between the base station and the application server for each user device whose credentials are authenticated, the default connection (a general connection) may be sufficient for all user devices that are authenticated.

Before accepting the limited access service, the user device of the vehicle is authenticated by sending in block 403 an authentication request with the received one or more credentials to the application server. Since the one or more credentials are user device-specific, the one or more credentials received from the user device may comprise information identifying the user device, or corresponding information in the request may be treated as credentials and forwarded in the request as one of the one or more credentials to the application server. When a response to the authentication request is received in block 404, it is checked in block 405, whether the authentication was successful, i.e. whether the user device of the terminal was authenticated. If the authentication was successful (block 405: yes), one or more radio bearers are configured in block 406 for the limited access service, and establishment of a connection from the base station to the user device of the vehicle is caused in block 407 by sending a response with information on the one or more radio bearers in a response to the request for limited access service.

If the authentication was not successful (block 405: no), the request for limited access service is rejected in block 408.

Figure 5:
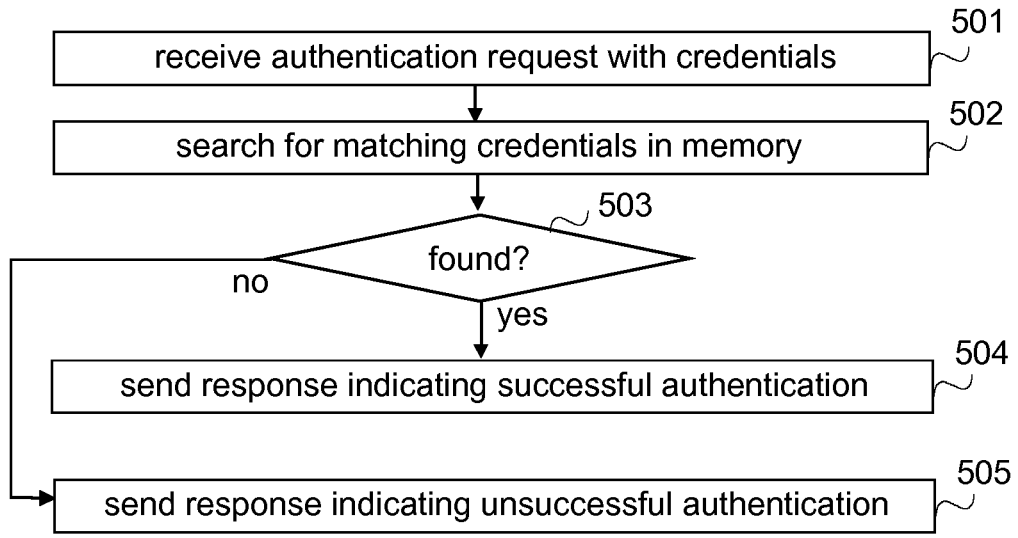

FIG. 5 is a flow chart illustrating an exemplified basic functionality of an application server, or more precisely basic functionality of the limited access authentication, authorization and accounting unit. For the sake of clarity, a V2X application server is used as an example of the application server.

Referring to FIG. 5, when an authentication request with the one or more credentials is received in block 501, matching one or more credentials are searched for in block 502 amongst credentials preconfigured and stored for the application. If the V2X application server, or the intelligent transportation system, has provided the one or more credentials to the user device of vehicle, there will be a match. If the one or more matching credentials are found (block 503: yes), sending a response that indicates successful authentication is caused in block 504. If the one or more matching credentials are not found (block 503: no) sending a response that indicates unsuccessful authentication is caused in block 505.

Basically the process described with FIG. 5 is the same as is performed to determine whether or not access to a V2X application (service) is granted or not, but the process of FIG. 5 is performed to authenticate the user for limited access services in the radio access network.

Figure 6:
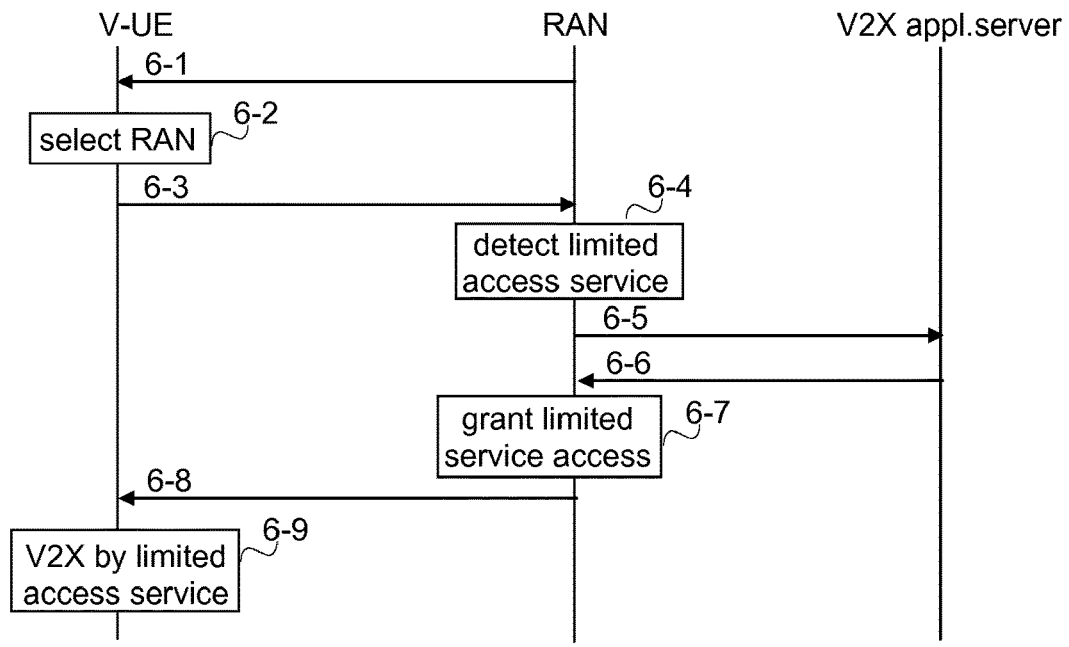
FIG. 6 illustrates an example of information exchange.

FIG. 6 illustrate an example of information exchange. In the example it is assumed that there is already a connection between the base station (radio access network) and the V2X application server (the intelligent transportation system).

Referring to FIG. 6, the radio access network RAN broadcast message 6-1, which comprises indications of V2X support and limited access service support. The limited access service support may be provided to all user devices regardless of their home network, or possible network access restrictions in a cell provided by the RAN.

The user device of the vehicle V-UE determines that a discovered RAN, or its cell, is available with limited access services for needed V2X communications to be selected, and selects in point 6-2 the RAN. The selection criteria may be implicitly or explicitly based on indication that the available RAN is at least supporting V2X communications in general and, in addition, supporting the limited access service. The user device of the vehicle, or more precisely, its enhanced access unit, may be configured to prioritize to use the limited access services provided by another network for V2X communications even when the user device is within the coverage of its home network, for example in case the user device of the vehicle UE has no need for full network access for other applications and/or services.

The selection causes establishment of a radio resource control (RRC) connection with the selected RAN. Therefore the user device of the vehicle, V-UE, sends message 6-3. Message may be an RRC connection establishment request, which indicates a request for the limited access service and the one or more credentials. Naturally the credentials for the V2X service may be provided in a subsequent message.

When receiving message 6-3, the RAN, or more precisely a base station providing the cell, detects in point 6-4 that the request is for the limited access service, and therefore verifies the provided one or more credentials by performing authentication of the V-UE. In other words, to authenticate the V-UE, the RAN sends an authentication message 6-5 with the one or more credentials, to the V2X application server, and receives response in message 6-6.

The RAN detects in point 6-7 that the authentication for the limited access service was successful, and therefore it makes a decision to grant to the V-UE the limited access service. Therefore the RAN configures one or more radio bearers and sends message 6-8. Message 6-8 may be an RRC connection establishment with the limited access service radio bearer configuration over the radio interface between the RAN (base station) and the V-UE.

When the V-UE receives message 6-8, it starts in point 6-9 V2X communication with the limited access service. The communication may be limited to take place only within the RAN domain. The communication may be used to control the resource allocation for sidelink (SL) communication (SL is a direct link between two V-UEs). The communication may be used to transmit the data for an optimized path offered by the limited access service between V-UE and the V2X application server.

Depending on the network connection between the RAN and V2X application server, the limited access services may include connectionless packet access for the V-UE, routed via the V2X application server, and the intelligent transportation system. The route via the V2X application server may also be utilized for mobility management of the V-UE when it is in an idle mode, since the V-UE is not having a regular core network access, or when the V-UE is not in a regular active state of the serving network.

Although not illustrated in the above example, it may be that in the same geographical area there are overlapping RANs, or cells of different operators that each are configured to provide the limited access services. In such a situation, the application server, for example the V2X server and/or ITS, or a corresponding system whereto an application server belongs, may be configured to share, or coordinate sharing of, the spectrum between different operators' RAN in flexible and dynamic way, for example based on the real load of the V2X communication in each operator's RAN, or at least on the overlapping areas of the RANs. The sharing/coordination may be on the spectrum/resource usage (for example, either statically or dynamically share the spectrum/radio resources among the overlapping cells of different operators network) and/or on coordinating the communication between the V-UEs access to the different cells. For example, the V-UE, upon detecting multiple cells with the limited access service, may select one cell for requesting the limited access service. For the selection, the V-UE may be provided the access priority on different RANs/cells in the same way as in a conventional network and cell selection, with the exception that the access priority to the limited access service among the multiple overlapping cells providing the limited access service is coordinated via the V2X application server.

As can be seen from the above, the limited access service may be provided without setting up non access stratum services for the user device of the vehicle, and no core network is involved even for the authentication. However, application level authentication is provided, result being that the user device of the vehicle will be served with some security in the network side. Since the access is to a limited access services, roaming restrictions between operators are not compromised in general. Further, the above disclosed authentication method for limited access service provides a quick and effective authentication for supporting multioperator requirements of V2X services. For example, V2V (vehicle to vehicle) communications between capable and authorized user devices of vehicles are enabled with the disclosed authentication method regardless whether they are subscribers of the same operators or different operators.

The blocks, related functions, and information exchanges described above by means of FIGS. 3 to 6 are in no absolute chronological order, and some of them may be performed simultaneously or in an order differing from the given one. Other functions can also be executed between them or within them, and other information may be sent, and/or other rules applied. For example, if there are overlapping coverages of radio access networks of different operators, and only one of the radio access network is configured to support the above described authentication for the limited access service, all user devices of vehicles may be instructed to access to the same RAN or cell for V2X communication regardless whether it is a home network or not. Naturally, if all user devices of vehicles are configured to use the limited access service for V2X communication whenever available, the result will be the same. Some of the blocks or part of the blocks or one or more pieces of information can also be left out or replaced by a corresponding block or part of the block or one or more pieces of information.

The techniques and methods described herein may be implemented by various means so that an apparatus/device configured to support information sharing based on at least partly on what is disclosed above with any of FIGS. 1 to 6, including implementing one or more functions/operations of a corresponding user device of the vehicle or base station (RAN) or V2X application server described above with an embodiment/example, for example by means of any of FIGS. 3 to 6, comprises not only prior art means, but also means for implementing the one or more functions/operations of a corresponding functionality described with an embodiment, for example by means of any of FIGS. 3 to 6, and it may comprise separate means for each separate function/operation, or means may be configured to perform two or more functions/operations. For example, one or more of the means and/or the enhanced access, and/or the limited access unit and/or the limited access authentication unit, described above may be implemented in hardware (one or more devices), firmware (one or more devices), software (one or more modules), or combinations thereof. For a hardware implementation, the device(s) of embodiments may be implemented within one or more application-specific integrated circuits (ASICs), digital signal processors (DSPs), digital signal processing devices (DSPDs), programmable logic devices (PLDs), field programmable gate arrays (FPGAs), radio-frequency circuits (RFICs), processors, controllers, micro-controllers, microprocessors, logic gates, decoder circuitries, encoder circuitries, other electronic units designed to perform the functions described herein by means of FIGS. 1 to 6, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art.

Additionally, the components described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 7:
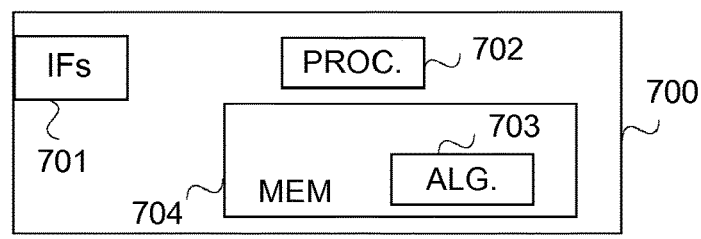
FIGS. 7 to 9 are schematic block diagrams.

FIG. 7 provides a base station (apparatus, device, network node providing wireless access) according to some embodiments. FIG. 7 illustrates a base station configured to carry out at least the functions described above in connection with forwarding credentials and configuring radio bearers. Each base station may comprise one or more communication control circuitry, such as at least one processor 7902, and at least one memory 704, including one or more algorithms 703, such as a computer program code (software) wherein the at least one memory and the computer program code (software) are configured, with the at least one processor, to cause the base station to carry out any one of the exemplified functionalities of the base station described above.

Figure 8:
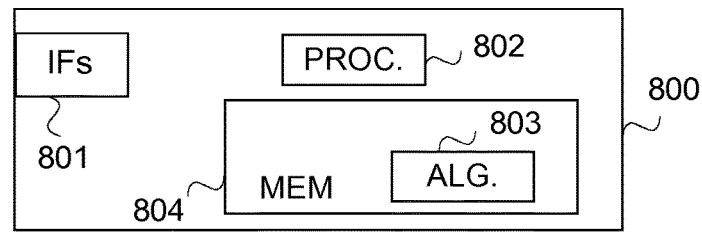

FIG. 8 provides a user device (apparatus, equipment, user device of the vehicle) according to some embodiments. FIG. 8 illustrates a user device configured to carry out at least the functions described above in connection with information sharing. Each user device may comprise one or more communication control circuitry, such as at least one processor 802, and at least one memory 804, including one or more algorithms 803, such as a computer program code (software) wherein the at least one memory and the computer program code (software) are configured, with the at least one processor, to cause the user device to carry out any one of the exemplified functionalities of the user device described above.

Figure 9:
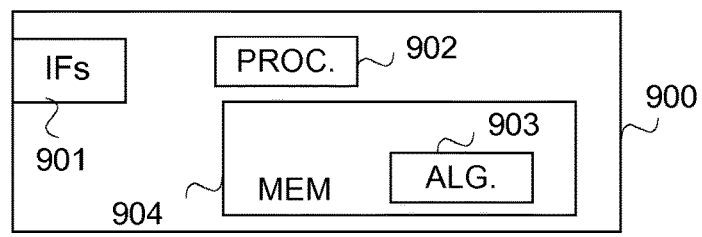

FIG. 9 provides an application server (apparatus, device) according to some embodiments. FIG. 9 illustrates an application server configured to carry out at least the functions described above in connection with authenticating and a V2X application server. Each application server may comprise one or more communication control circuitry, such as at least one processor 902, and at least one memory 904, including one or more algorithms 903, such as a computer program code (software) wherein the at least one memory and the computer program code (software) are configured, with the at least one processor, to cause the application server to carry out any one of the exemplified functionalities of the (V2X) application server described above.

Referring to FIGS. 7, 8 and 9, at least one of the communication control circuitries in the corresponding device 700, 800 and 900 is configured to provide the limited access unit, the enhanced access unit, and the limited access authentication unit, correspondingly, and to carry out functionalities described above by means of any of FIGS. 2 to 6 by one or more circuitries.

Referring to FIGS. 7, 8 and 9, the memory 704, 804, 904 may be implemented using any suitable data storage technology, such as semiconductor based memory devices, flash memory, magnetic memory devices and systems, optical memory devices and systems, fixed memory and removable memory.

Referring to FIGS. 7, 8 and 9, the device may further comprise different interfaces 701, 801, 901 such as one or more communication interfaces (TX/RX) comprising hardware and/or software for realizing communication connectivity over the medium according to one or more communication protocols. The communication interface may provide the device with communication capabilities to communicate in the cellular communication system and enable communication between user devices (terminal devices) and different network nodes and/or a communication interface to enable communication between different network nodes, for example. The communication interface may comprise standard well-known components such as an amplifier, filter, frequency-converter, (de)modulator, and encoder/decoder circuitries, controlled by the corresponding controlling units, and one or more antennas. The communication interfaces may comprise radio interface components. The communication interfaces may comprise optical interface components providing the base station with optical fibre communication capability.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a user device or an access point, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access point or a user device or other computing or network device.

In embodiments, the at least one processor, the memory, and the computer program code form processing means or comprises one or more computer program code portions for carrying out one or more operations according to any one of the embodiments of FIGS. 3 to 6 or operations thereof.

Embodiments as described may also be carried out in the form of a computer process defined by a computer program or portions thereof. Embodiments of the methods described in connection with FIGS. 2 to 6 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A network node providing wireless access, the network node comprising:
   at least one processor; and
   at least one memory including computer program code;
   the at least one memory and computer program code configured to, with the at least one processor, cause an access point at least to perform:
   providing a limited access service to one or more applications, wherein the limited access service is provided without setting up non access stratum services for a user device and in the limited access service the user device is not required to access a core network for authentication and for communication;
   broadcasting information that the network node supports the limited access service, wherein the broadcasted information specifically indicates support for vehicle-to-everything communications;
   receiving from the user device a request for the limited access service with one or more credentials for an application, the application comprising a vehicle-to-everything service application;
   establishing a connection to an application server for authentication, the application server comprises a vehicle-to-everything application server;
   sending, in response to the request, an authentication request with the one or more credentials to the application server for the application;
   receiving a response indicating a result of authentication of the one or more credentials from the application server;
   in response to the response indicating a successful authentication, granting the user device the limited access service for the application by:
   configuring one or more radio bearers for the limited access service for the application; and
   causing sending to the user device a radio resource control connection establishment response that indicates the one or more radio bearers as a response granting the limited access service for the application,
   wherein the network node and another network node have overlapping coverage areas, and the other network node has a service provider different from the network node,
   wherein one or more user devices subscribed with the network node access the other network node to utilize the limited access service for vehicle-to-everything communication.

2. A user device, comprising:
   at least one processor; and
   at least one memory including computer program code and, at least for one vehicleto-everything application, one or more preconfigured credentials;
   the at least one memory and computer program code configured to, with the at least one processor, cause the user device at least to perform:

detecting a cell providing limited access service to one or more vehicle-to-everything applications including the at least one vehicle-to-everything application, wherein the limited access service is provided without setting up non access stratum services for the user device and in the limited access service the user device is not required to access a core network for authentication and for communication;

causing sending a request for the limited access service for the at least one vehicleto-everything application with the one or more preconfigured credentials in a radio resource control connection request to a network node providing the detected cell;

causing sending the request with the one or more preconfigured credentials in response to the cell locating in a network a service provider different from the service provider to which the user device has a subscription; and performing, in response to receiving the radio resource control connection establishment response from the network node that indicates one or more radio bearers configured for the limited access service for the at least one vehicle-to-everything application, limited access service communication for the at least one vehicle-to-everything application using the indicated one or more radio bearers;

wherein the user device is configured to prioritize the limited access service provided by another network for vehicle-to-everything communications even when the user device is within coverage of its home network.

3. A vehicle-to-everything application server, comprising:
at least one processor; and
at least one memory including computer program code;
the at least one memory and computer program code configured to, with the at least one processor, cause the vehicle-to-everything application server at least to perform:

establishing a connection from a network node to the vehicle-to-everything application server for authentication;

receiving, from the network node providing wireless access to user devices, an authentication request comprising one or more credentials, wherein the network node providing wireless access to a user device provides a limited access service to one or more vehicle-to-everything service applications, wherein the limited access service is provided without setting up non access stratum services for the user device and in the limited access service the user device is not required to access a core network for authentication and for communication;

searching, amongst credentials issued by the vehicle-to-everything application server or an intelligent transportation system whereto the vehicle-to-everything application server belongs, a match for the received one or more credentials; and sending an authentication response indicating a successful authentication in response to a match being found, wherein the network node and another network node have overlapping coverage areas, and the other network node has a service provider different from the network node, wherein one or more user devices subscribed with the network node access the other network node to utilize the limited access service for vehicle-to-everything communication.

4. A method, comprising:
providing, by a network node providing wireless access, a limited access service to one or more applications, wherein the limited access service is provided without setting up non access stratum services for a user device and in the limited access service the user device is not required to access a core network for authentication and for communication;

broadcasting, by the network node, information that the network node supports the limited access service, wherein the broadcasted information specifically indicates support for vehicle-to-everything communications;

receiving, in the network node from the user device, a request for the limited access service with one or more credentials for an application, the application comprising a vehicle-to-everything service application;

establishing a connection to an application server for authentication, the application server comprises a vehicle-to-everything application server;

sending, in response to the request, from the network node, an authentication request with the one or more credentials to the application server for the application;

receiving, in the network node, a response indicating a result of authentication of the one or more credentials from the application server; and in response to the response indicating a successful authentication, granting, by the network node, the user device the limited access service for the application by:

configuring one or more radio bearers for the limited access service for the application; and causing sending to the user device a radio resource control connection establishment response that indicates the one or more radio bearers as a response granting the limited access service for the application, wherein the network node and another network node have overlapping coverage areas, and the other network node has a service provider different from the network node, wherein one or more user devices subscribed with the other network node access the network node to utilize the limited access service for vehicle-to-everything communication.

5. A method comprising:
storing, by a user device, in a memory, at least for one vehicle-to-everything application, one or more preconfigured credentials;

detecting, by the user device, a cell providing limited access service to one or more vehicle-to-everything applications including the at least one vehicle-to-everything application, wherein the limited access service is provided without setting up non access stratum services for the user device and in the limited access service the user device is not required to access a core network for authentication and for communication;

causing, by the user device, sending a request for the limited access service for the at least one vehicle-to-everything application with the one or more preconfigured credentials in a radio resource control connection request to a network node providing the detected cell;

causing sending the request with the one or more preconfigured credentials in response to the cell locating in a network a service provider different from the service provider to which the user device has a subscription; and performing, in response to receiving the radio resource control connection establishment response from the network node that indicates one or more radio bearers configured for the limited access service for the at least one vehicle-to-everything application, limited access service communication for the at least one vehicle-to-everything application using the indicated one or more radio bearers;

wherein the user device is configured to prioritize the limited access service provided by another network for vehicle-to-everything communications even when the user device is within coverage of its home network.

6. A non-transitory computer readable medium comprising program instructions encoded thereon which, when executed on an apparatus configured to act as a network node providing wireless access, cause the apparatus to perform at least:

providing a limited access service to one or more applications, wherein the limited access service is provided without setting up non access stratum services for a user device and in the limited access service the user device is not required to access a core network for authentication and for communication;

broadcasting, by the network node, information that the network node supports the limited access service, wherein the broadcasted information specifically indicates support for vehicle-to-everything communications;

receiving, in the network node from the user device, a request for the limited access service with one or more credentials for an application, the application comprising a vehicle-to-everything service application;

establishing a connection to an application server for authentication, the application server comprises a vehicle-to-everything application server;

sending, in response to the request, an authentication request with the one or more credentials to the application server for the application; and receiving a response indicating a result of authentication of the one or more credentials from the application server; and in response to the response indicating a successful authentication, granting the user device the limited access service for the application by:

configuring one or more radio bearers for the limited access service for the application; and causing sending to the user device a radio resource control connection establishment response that indicates the one or more radio bearers as a response granting the limited access service for the application, wherein the network node and another network node have overlapping coverage areas, and the other network node has a service provider different from the network node, wherein one or more user devices subscribed with the network node access the other network node to utilize the limited access service for vehicle-to-everything communication.

7. A non-transitory computer readable medium comprising program instructions encoded thereon which, when executed on an apparatus configured to act as a user device in a wireless network, cause the apparatus to perform at least:

storing, in a memory, at least for one vehicle-to-everything application, one or more preconfigured credentials;

detecting a cell providing limited access service to one or more vehicle-to-everything applications including the at least one vehicle-to-everything application, wherein the limited access service is provided without setting up non access stratum services for the user device and in the limited access service the user device is not required to access a core network for authentication and for communication;

causing sending a request for the limited access service for the at least one vehicleto-everything application with the one or more preconfigured credentials in a radio resource control connection request to a network node providing the detected cell;

causing sending the request with the one or more preconfigured credentials in response to the cell locating in a network a service provider different from the service provider to which the user device has a subscription; and performing, in response to receiving the radio resource control connection establishment response from the network node that indicates one or more radio bearers configured for the limited access service for the at least one vehicle-to-everything application, limited access service communication for the at least one vehicle-to-everything application using the indicated one or more radio bearers;

wherein the user device is configured to prioritize the limited access service provided by another network for vehicle-to-everything communications even when the user device is within coverage of its home network.

* * * * *